W. B. RUSSELL.
THERAPEUTIC DEVICE.
APPLICATION FILED JAN. 13, 1913.
1,073,524.
Patented Sept. 16, 1913.
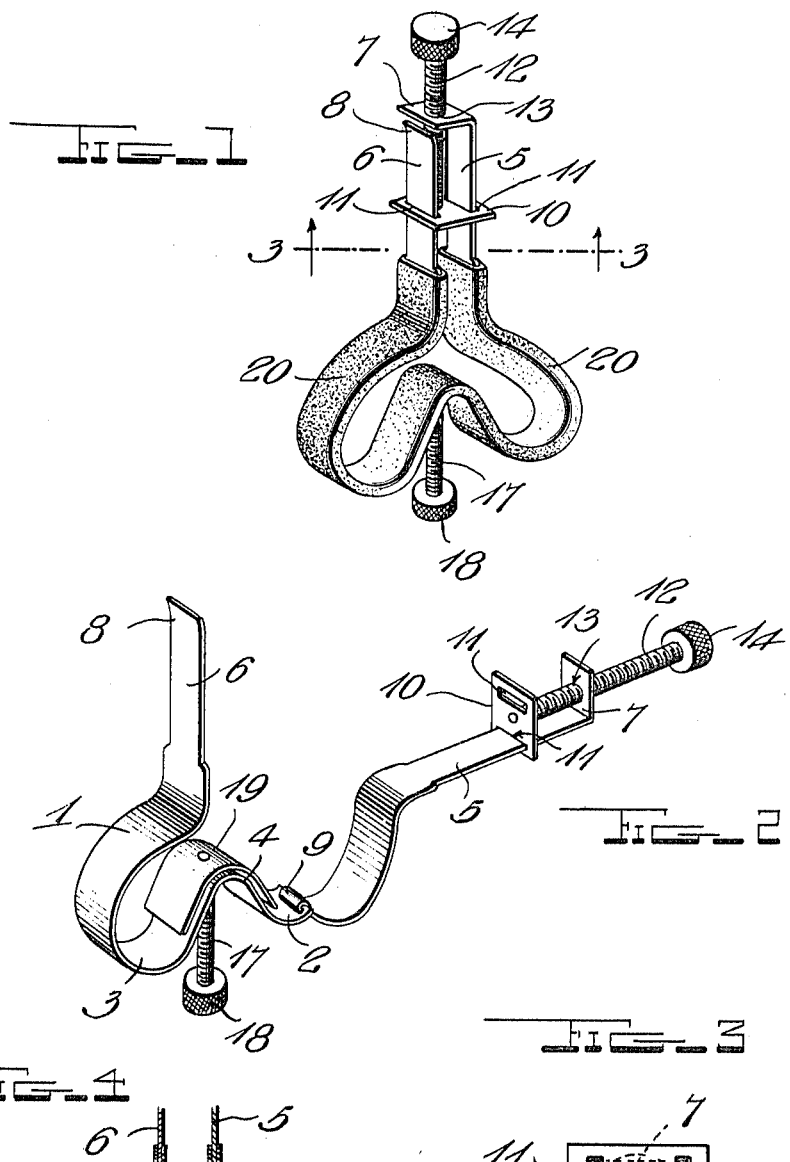
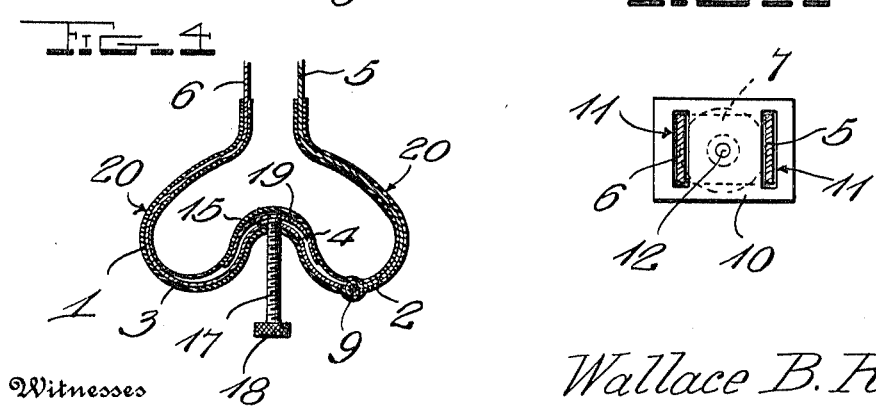
Witnesses
Inventor
Wallace B. Russell
Attorneys

UNITED STATES PATENT OFFICE.

WALLACE BYRNE RUSSELL, OF CHICAGO, ILLINOIS.

THERAPEUTIC DEVICE.

1,073,524.     Specification of Letters Patent.     Patented Sept. 16, 1913.

Application filed January 13, 1913. Serial No. 741,818.

*To all whom it may concern:*

Be it known that I, WALLACE BYRNE RUSSELL, citizen of the United States, residing at Chicago, in the county of Cook and State of Illinois, have invented certain new and useful Improvements in Therapeutic Devices; and I do declare the following to be a full, clear, and exact description of the invention, such as will enable others skilled in the art to which it appertains to make and use the same.

This invention relates to improvements in therapeutic devices.

One object of the invention is to provide a device of this character adapted to be quickly and easily applied to and removed from the male organ of generation and which when applied, will produce in an improved manner, the erection of this organ, when the latter has lost the power of natural erection.

Another object is to provide a therapeutic device of the character described having adjustable means for producing the necessary amount of pressure at the proper place on the organ to accomplish the desired result without discomfort to the user.

With these and other objects in view, the invention consists of certain novel features of construction, and the combination and arrangement of parts as will be more fully described and claimed.

In the accompanying drawings: Figure 1 is a perspective view of my improved therapeutic device, showing the parts in closed or operative position; Fig. 2 is a similar view with the parts in an open position, as when being applied to or removed from the organ; Fig. 3 is a cross sectional view taken on the line 3—3 of Fig. 1, looking upwardly or in the direction of the arrows; Fig. 4 is a detail vertical section of the lower portion of the device.

My improved therapeutic device or appliance comprises a frame constructed of a narrow strip of spring metal bent intermediate of its ends to form lateral spring loops 2 and 3 and a central inwardly extending loop or projection 4. The ends of the strip after forming the loops 2 are slightly reduced in width and are extended upwardly to form parallel bars 5 and 6 which are spaced apart as shown. The bar 5 of the frame is longer than the bar 6 and said bar 5 has its upper extremity bent to form a right angular lug 7 which projects inwardly or toward the bar 6 as shown. The extremity of the bar 6 is turned or curved outwardly to a slight degree as shown at 8.

The frame 1 is formed in two parts hinged together at the lowest point in the loop 2 as shown at 9 whereby the outer half of this loop and the bar 5 of the frame may be swung outwardly or away from the loop 3 and bar 6, thus opening the frame to permit the same to be quickly and easily engaged with and removed from the organ. The hinged members of the frame 1 are held together and in operative position by a connecting plate 10 having therein parallel slots 11 which are engaged with the upwardly extending bars 5 and 6 of the frames. The plate 10 is adjustably supported in engagement with the bars 5 and 6 by an adjusting screw 12 which has a threaded engagement with a screw hole 13 in the lug 7 on the outer end of the bar 5 and which has its inner end swiveled in the plate 10 as shown. The screw 12 is slightly longer than the reduced portions of the bars 5 and 6 and has on its outer end a milled head 14 whereby the screw is readily operated for adjusting the plate 10 on the bars 5 and 6. The adjustment of the plate 10 on the bars 5 and 6 regulates the resiliency of the spring loops 2 and 3 of the frame so that the upper sides of said loops which engage the organ may be made more or less rigid or are permitted to expand to a greater or less degree thus regulating the pressure thereof on the upper side of the organ when the latter is forced against the upper portions of the loops in a manner hereinafter described. When it is desired to open the frame for applying or removing the device, the screw 12 is turned in the proper direction for drawing the plate 10 outwardly until the same disengages the outer end of the bar 6 after which the hinged members of the frame may be swung open or apart.

In the loop or projection 4 formed in the center of the lower side of the frame 1 is a threaded aperture 15 with which is engaged a plate adjusting screw 17 having on its outer end a milled head 18. The inner end of the screw has a swiveled connection with a curved or loop-shaped pressure plate 19 the curvature of which conforms substantially with the curvature of the loop or projection 4 of the frame, over which said plate is disposed and adjusted by the screw 17.

By turning the screw 17 in the proper direction for moving the plate inwardly, the latter will engage and force the organ upwardly against the upper sides of the loops 2 and 3 with a greater or less pressure according to the distance the screw and plate are adjusted inwardly.

By constructing the frame 1 and arranging the adjustable pressure applying mechanism therein as herein shown and described the correct amount of pressure may be applied to and maintained on the organ at the proper place or places thereon for quickly producing the desired results without injury or discomfort to the user. The spring loops 2 and 3, the central loop 4 and the pressure plate 19 are preferably covered by a casing 20 of rubber, chamois skin or other soft material to prevent these parts from injuring the organ. The part of the casing engaging the loop 4 and pressure plate 19 will stretch or will be made sufficiently loose to permit the adjustment of this plate.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A therapeutic device for the purpose described comprising a frame formed in hingedly connected sections and comprising lateral spring loops, a central inwardly extending loop and parallel bars, an apertured lug on the end of one of said bars, a slotted connecting plate having a sliding engagement with said bars to hold said sections of the frame together in operative position, and a plate adjusting screw having a threaded engagement with said lug and a swiveled connection with said plate whereby the latter may be adjusted on said bars to regulate the resiliency of said spring loops and whereby the plate may be disengaged from one of said bars to permit the sections of the frame to be opened.

2. A therapeutic device of the character described comprising a frame having laterally extending spring loops, and a central inwardly extending loop, a plate adjusting screw having a threaded engagement with said inwardly extending loop and a pressure plate swiveled on said screw and adapted to be adjusted thereby for the purpose described.

3. A therapeutic device of the character described comprising a frame having laterally extending spring loops, a central inwardly extending loop and parallel bars adjustable means to connect said bars and to regulate the resiliency of said spring loops, a pressure plate adjusting screw having a threaded engagement with said inwardly extending loop, and a pressure plate swiveled on said screw and adapted to be adjusted thereby to regulate the pressure of the frame on the organ to which the same is applied.

4. A therapeutic device for the purpose described comprising a frame formed in hingedly connected sections and comprising lateral spring loops, a central inwardly extending loop and parallel bars, means engaged with said bars to fasten said hinged sections of the frame together, a pressure plate adjusting screw having a threaded engagement with said inwardly extending loop, and a pressure plate swiveled on the inner end of said screw and adapted to be adjusted thereby to regulate the pressure of the frame on the organ to which it is applied.

5. A therapeutic device for the purpose described comprising a frame formed in hingedly connected sections and comprising lateral spring loops, a central inwardly extending loop and parallel bars, an apertured lug on the end of one of said bars, a slotted connecting plate having a sliding engagement with said bars to hold said sections of the frame together in operative position, a plate adjusting screw having a threaded engagement with said lug and a swiveled connection with said plate whereby the latter may be adjusted on said bars to regulate the resiliency of said spring loops and whereby the plate may be disengaged from one of said bars to permit the sections of the frame to be opened, a pressure plate adjusting screw having a threaded engagement with said inwardly extending loop, and a pressure plate swiveled on the inner end of said screw and adapted to be adjusted thereby to regulate the pressure of the frame on the organ to which it is applied.

In testimony whereof I have hereunto set my hand in presence of two subscribing witnesses.

WALLACE BYRNE RUSSELL.

Witnesses:
JULIUS C. GREENBAUM,
BENJ. P. RUEKBERG.